(12) United States Patent
Leitel et al.

(10) Patent No.: US 7,239,449 B2
(45) Date of Patent: Jul. 3, 2007

(54) ILLUMINATION MODULE FOR COLOR DISPLAY

(75) Inventors: Armin Leitel, Jena (DE); Ralf Waldhäusl, Jena (DE); Peter Schreiber, Jena (DE); Uwe Detlef Zeitner, Weimar (DE)

(73) Assignee: Sypro Optics GmbH, Jena (DE)

( * ) Notice: Subject to any disclaimer, the term of this patent is extended or adjusted under 35 U.S.C. 154(b) by 176 days.

(21) Appl. No.: 10/938,121

(22) Filed: Sep. 10, 2004

(65) Prior Publication Data

US 2005/0063171 A1 Mar. 24, 2005

(30) Foreign Application Priority Data

Sep. 10, 2003 (DE) ............... 103 41 626

(51) Int. Cl.
*G02B 27/10* (2006.01)
*G02B 27/14* (2006.01)
*G03B 21/00* (2006.01)

(52) U.S. Cl. .......... 359/618; 359/634; 353/31
(58) Field of Classification Search ........ 359/618, 359/629, 634; 353/94, 31
See application file for complete search history.

(56) References Cited

U.S. PATENT DOCUMENTS 5,777,789 A 7/1998 Chiu et al.

2005/0254018 A1* 11/2005 Magarill et al. .......... 353/94

FOREIGN PATENT DOCUMENTS

| DE | 199 25 318 C1 | 2/2001 |
| DE | 696 11 561 T2 | 6/2001 |
| EP | 1 403 695 A1 | 3/2004 |
| WO | WO 00/58772 | 10/2000 |
| WO | WO 00/74390 A1 | 12/2000 |

* cited by examiner

*Primary Examiner*—Alicia M Harrington
(74) *Attorney, Agent, or Firm*—Patterson, Thuente, Skaar & Christensen, P.A.

(57) ABSTRACT

The invention relates to an illumination module for color display, preferably for use in data or video projectors as well as rear projection television sets, in which the light from at least three luminescent diodes (LEDs) or LED arrays of the base colors red, green and blue is collimated at a point provided for connection to a display unit and ranged on an optical axis of the illumination module. An LED or an LED array of a base color with a beam path (Lr) oriented in the direction of the display unit is arranged on the optical axis of the illumination module. For the purpose of color mixing, the LEDs and LED arrays of the other base colors are attached in such a way tat their beam paths (Lg, Lb) are laterally input in sequence under input angles ($\alpha$, $\beta$) of <90 degrees into the beam path (Lr) of the first base color.

21 Claims, 1 Drawing Sheet

ILLUMINATION MODULE FOR COLOR DISPLAY

FIELD OF THE INVENTION

The invention relates to an illumination module for color display, preferably for use in data or video projectors as well as rear projection television sets, in which the light from at least three luminescent diodes (LEDs) or LED arrays of the base colors red, green and blue is focused at a point provided for connection to a display unit and arranged on an optical axis of the illumination module.

BACKGROUND OF THE INVENTION

Currently, only high-pressure lamps are used as illumination modules for "optical engines" of data and video projectors, for projection monitors, as well as television sets these lamps emit a continuous spectrum in both visible light and the adjacent ranges (UV, IR). However, only narrow wavelength ranges of the colors red, green and blue are needed to produce an image. For sequential coloration, these colors are utilized individually and sequentially, with the use of a color wheel. The wavelengths not needed in this process are filtered out.

Disadvantages result from the use of high-pressure lamps in connection with the sequential generation of the colors red, green and blue, especially for small, mobile projectors, due to the size and limited serviceable life of the lamp, as well as the required use of a color wheel and UV and IR filters, so that such arrays are very cost-intensive. In addition, light efficiency is low.

To overcome these disadvantages, various light-emitting diodes (LEDs) have been proposed as light sources. When using three modulated LEDs in the colors red, green and blue, the color wheel can be eliminated. Instead, an optical array must be found that, as efficiently as possible, collects, bundles, mixes and homogenizes the light emitted by the LEDs in a large solid angle and displays it on an imager.

Also known in the art are glass prisms for connecting multiple light sources, which are provided with special optical layers (color mixing cubes). Disadvantages include absorption losses and relatively high spatial requirements, as well as high costs.

To connect multiple colored light bundles, arrays of plane mirrors are known which possess dichroitic layers that are adjusted to the colors used, wherein the mixing of two colors into the beam path of the third color normally occurs below 90 degrees, that is, the plane mirrors are positioned at an angle of 45 degrees relative to the optical axis of the beam path of the third color.

In DE 102 37 202.0, a solution is described in which multiple LEDs are arranged directly on the entry surface, on the lateral surfaces or in proximity to the entry surface of a light-mixing rod, such that the bulk of their emitted light is mixed in the integrator and supplied to the light exit surface.

In addition, EP 125148 shows a beam transformation of the light coming from the LEDs by means of fibers, wherein each of the individual fibers is assigned to an emitter. The light from the LEDs is transferred to an integrator through the optical fibers or through fiber arrays. Color management is achieved by switching the individual color LEDs on and off in accordance with the generated color signals. A display computer synchronizes switching the LEDs on and off to correspond to the image data supplied by a computer.

Color combiners for superimposing the individual colors, for example, are proposed for a multi-channel application.

The disadvantages of the known solutions lie, for the most part, in the inefficient use of the light flux emitted by the LEDs during mixing into fibers or a light-mixing rod. Color mixing using dichroitic prism arrays also has its limits in terms of the size and efficiency of the illumination module.

Based on the above, the underlying goal of the invention is to further develop an illumination module, using LEDs as light sources, in such a way that, while minimizing the size of the module, the light efficiency of each of the three base colors of the LEDs, allowing for the technically available light flux, is increased.

SUMMARY OF THE INVENTION

This goal is achieved, according to the invention, with an illumination module of the type stated initially, in that an LED or an LED array of a base color with a beam path oriented in the direction of the display unit is arranged on the optical axis of the illumination module and, for the purpose of color mixing, the LEDs or LED arrays of the other base colors are attached in such a way that their beam paths are laterally input in sequence under input angles of <90 degrees into the beam path of the first base color, wherein the input angles are the angles of the optical axes of the LEDs or LED arrays to the optical axis of the illumination module.

Advantageously, for the purpose of inputting the two base colors into the beam path of the first base color, dichroic filters are provided, which are arranged at an angle of <45 degrees to the optical axis of the first base color.

An advantageous embodiment variant consists in the red light of the LED or the LED array, with a beam path oriented in the direction of the display unit, being arranged on the optical axis of the illumination module, while the light beams emitted by the green LED or LED array are inputted into the beam path of the red LED or LED array, and the light beams emitted by the blue LED or LED array are inputted into the beam path mixed by the base colors red and green.

As a result of the input angle of two base colors into the beam path of the third base color being selected to be less <90 degrees, combined with the arrangement of the dichroic filters, a substantial improvement of the input efficiency is achieved in comparison to arrays whose input angle equals 90 degrees. This is caused, on the one hand, by the fact that polarization effects, which normally occur when the light beams of the input base colors impinge upon the dichroic filters under high angles of incidence, are reduced. On the other hand, more favorable spectral characteristics are achieved, because a greater optical thickness of the layers can be selected. In addition, spatial conditions that are acceptable for a large number of applications are achieved.

Advantageously, the input angles of the two laterally input base colors are equal and comprise 75 degrees. Optimal light efficiencies at the output of the illumination module can be achieved with these angles.

In addition to the input angles, it is meaningful, in the interest of achieving optimal color mixing, to use LEDs or LED arrays with principal wavelengths of 627 nm for the color red, 530 nm for the color green, and 455 nm for the color blue.

Another advantageous embodiment consists in designing the dichroic filter for inputting the light beams from the green LED as a long-pass filter with a wavelength for transmission in the range of 600 to 670 nm and for reflection in the range of 470 to 580 nm, wherein the reverse side of said filter should have a coating allowing complete transmission of the red light component.

In analogy to the above, a long-pass filter with a wavelength for transmission in the range of 480 to 670 nm, and for reflection in the range of 420 to 470 nm, should be used, the reverse side of which has a coating allowing complete transmission of the red and blue light component.

For the purpose of collimating the light components, convergent lenses with surfaces that are coated as a factor of the wavelength employed, are advantageously arranged between the LEDs and the dichroic filter, and between the dichroic filter and the point of connection to a light mixer, for example.

For reasons of cost-effective production, the external shape of the individual convergent lenses can be identical for each of the three base colors. In this connection, it has proven to be advantageous that said convergent lenses be aspheres made of plastic and having broadband anti-reflective coating on both sides.

To reduce the size of the illumination module, it can be advantageous to individually homogenize the light of each of the colored LEDs by arranging micro-optically produced lens arrays between the LED and the dichroic filters. As a result, a light mixer in the form of an integrator rod or tunnel can be avoided, and the light combined by means of the dichroic filter can be directly displayed on the imager using a simple lens array.

A chronological connection of the LEDs and the imager to the sequential color modulation (white balance) is established on the basis of the available maximum light flux at the output of the color mixing array for the three primary colors. The weaker the light flux, the longer is the relative time component of the color.

DETAILED DESCRIPTION OF THE INVENTION

Figure 1:
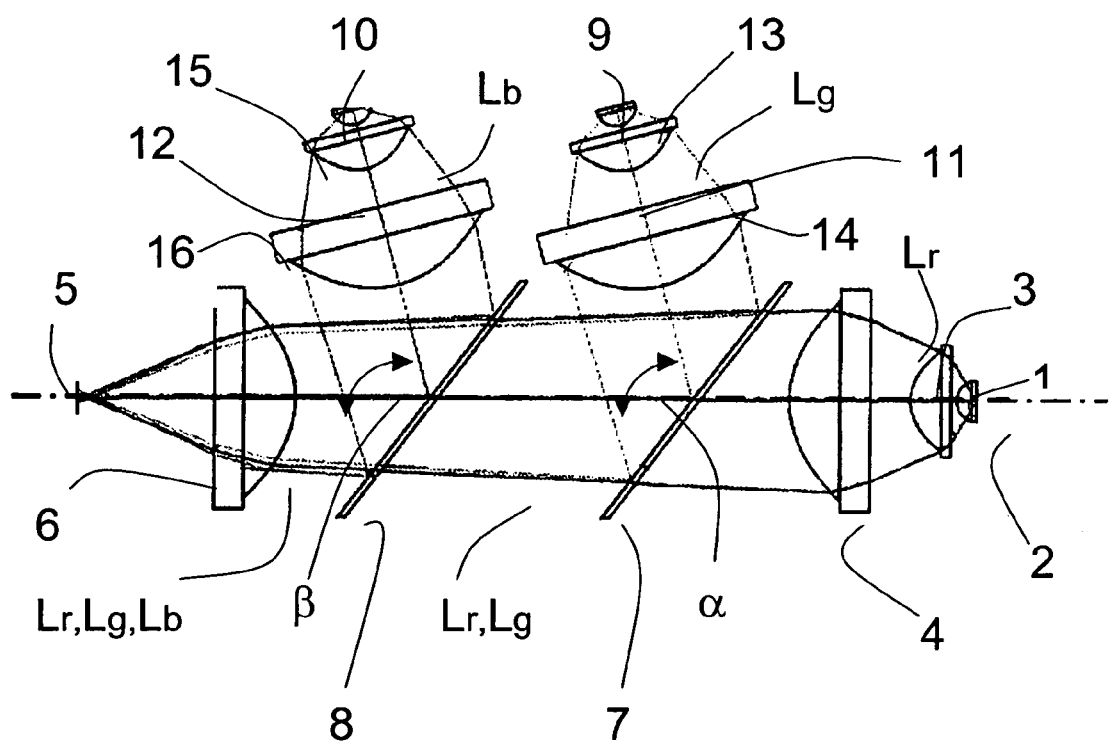
FIG. 1 is a cross sectional view of the present invention.

The illumination module, according to the invention, is described in greater detail in the following example of an embodiment.

The corresponding figure shows a red LED 1, whose optical axis lies on the optical axis 2 of the illumination module, wherein the light beams Lr are collimated through convergent lenses 3 and 4. For the purpose of focusing the light beams Lr onto the light entry surfaces 5 of a light-mixing rod, which is not depicted in detail, an additional convergent lens 6 is located in the beam path. The convergent lenses 3, 4 and 6 are broadband lumenized plastic lenses, which each have at least one aspheric surface and are arranged on the optical axis 2 in such a way that the aspheric surfaces of the convergent lenses 3 and 4 are oriented toward the light entry surface 5 and the aspheric surface of the convergent lens 6 is oriented toward the LED 1.

For the purpose of laterally inputting the colors green and blue on the optical axis 2, two dichroic filters 7 and 8 and arranged between the convergent lenses 4 and 6, wherein the dichroic filter 7 is arranged in such a way that it inputs the light beams Lg emitted by a green LED 9 into the red beam path Lr. In this connection, the dichroic filter 8 assumes the function of inputting the light beams Lb emitted by a blue LED 10 into the already mixed beam path comprising the red light beams Lr and the green light beams Lg.

The optical axis 11 of the green LED 9 and the optical axis 12 of the blue LED 10 are placed at angles of incidence α and β relative to the optical axis of the red LED 1 and/or relative to the optical axis 2 of the illumination module, wherein α and β each are 75 degrees.

The light beams Lg collimated by the green LED, impinge upon the dichroic filter 7 through the convergent lenses 13 and 14, and are input into the light beams Lr, which are completely transmitted by the dichroic filter 7. In analogy to the inputting of the light beams Lg, the light beams Lb emitted by the blue LED 10, impinge upon the dichroic filter 8 through the convergent lenses 15 and 16 and, together with the already combined light beams Lr and Lg, are deflected into the light entry surface 5. As already mentioned, the mixed light beams Lr, Lg and Lb are focused into the light entry surface 5 of a light-mixing rod by means of the convergent lens 6.

The dichroic filters 7 and 8 have anti-reflective coated rear surfaces, thus allowing the light beams Lr to be completely transmitted by the dichroic filter 7 and the light beams Lr and Lg to be completely transmitted by the dichroic filter 8. Because the inputting of the light beams Lg and Lb is to take place with virtually no loss of light, the dichroic filters 7 and 8 are provided with special thin-layer systems, which act as long-pass filters.

To achieve a high degree of light efficiency, the following dichroic filters with the following layers are used:

| Dichroic filter | Transmission | Reflection |
|---|---|---|
| 7 | 600–670 nm | 480–670 nm |
| 8 | 470–580 nm | 420–580 nm |

LIST OF REFERENCE SYMBOLS

1 LED (red)
2 Optical axis
3, 4 Convergent lens
5 Light entry surface
6 Convergent lens
7, 8 Dichroic filter
9, 10 LED (green, blue)
11, 12 Optical axis
13, 14, 15, 16 Convergent lens
Lr Light beams from LED 1 (red)
Lg Light beams from LED 9 (green)
Lb Light beams from LED 10 (blue)
α,β Input angle.

The invention claimed is:

1. An illumination module for color display, in which the light from at least three light emitting diodes of the base colors red, green and blue is focused at a point for connection to a display unit and arranged on an optical axis of the illumination module, wherein an LED or an LED array of a base color with a first beam path oriented in the direction of the display unit is arranged on the optical axis of the illumination module and, for the purpose of color mixing, the LEDs or LED arrays of the other base colors are attached in such a way that their respective beam paths are laterally input in sequence under input angles of less than ninety degrees into the first beam path of the first base color, wherein the input angles are the angles of the optical axes of the LEDs or LED arrays to the optical axis of the illumination module.

2. The illumination module for color display according to claim 1, in which, for the purpose of inputting the two base colors into the beam path of the first base color, dichroic filters are provided, which are arranged at an angle of less than forty five degrees to the optical axis of the illumination module.

3. The illumination module for color display according to claim 1, in which the red LED or the LED array, with a beam path oriented in the direction of the display unit, is arranged on the optical axis of the illumination module, the light beams emitted by the green LED or the LED array are input into the beam path of the red LED or LED array, and the light beams emitted by the blue LED or LED array are input into the beam path mixed by the base colors red and green.

4. The illumination module for color display according to claim 1, in which the in-put angles are equal and about seventy five degrees.

5. The illumination module for color display according to claim 1, in which the LEDs or LED arrays exhibit principal wavelengths of 627 nm for the color red, 530 nm for the color green, and 455 nm for the color blue.

6. The illumination module for color display according to claim 1, characterized in that the dichroic filter is designed for inputting the light beams from the green LED as a long-pass filter with a wavelength for transmission in the range of 600 to 670 nm, and for reflection in the range of 470 to 580 nm, wherein a reverse side of the dichroic filter has a coating allowing complete transmission of the red light component.

7. The illumination module for color display according to claim 1, in which the dichroic filter for inputting the light beams from the blue LED is a long-pass filter with a wavelength for transmission in the range of 480 to 670 nm and for reflection in the range of 420 to 470 nm, wherein a reverse side of the dichroic filter has a coating allowing complete transmission of the red and green light components.

8. The illumination module for color display according to claim 1, characterized in that identically shaped convergent lenses with surfaces that are coated as a factor of the wavelength employed are arranged between the LEDs and the dichroic filters.

9. The illumination module for color display according to claim 8, characterized in that the convergent lenses are aspheric and made of plastic.

10. The illumination module for color display according to claim 1, characterized in that a convergent lens that bundles the beam paths is provided in front of a point of connection to a light-mixer.

11. An illumination module for a color display having a first optical axis, comprising:
at least three light emitting diodes, the three light emitting diodes emitting light in three base colors;
a first of the three light emitting diodes having a first beam path and being oriented such that the first beam path is directed in a direction parallel to the first optical axis;
a second light emitting diode having a second beam path along a second optical axis and a third light emitting diode having a third beam path along a third optical axis;
the second and third light emitting diodes being positioned and oriented such that the second beam path and the third beam path are laterally spaced along the first optical axis and the second optical axis and the third optical axis are oriented at angles of less than ninety degrees relative to the first optical axis.

12. The illumination module as claimed in claim 11, further comprising dichroic filters, the dichroic filters being oriented at an angle of less that forty five degrees to the first optical axis.

13. The illumination module as claimed in claim 12, wherein and the second beam path is combined with the first beam path and then the third beam path is added to the already combined first and second beam paths.

14. The illumination module as claimed in claim 11, wherein the first light emitting diode emits red light, the second light emitting diode emits green light and the third light emitting diode emits blue light.

15. The illumination module as claimed in claim 11, wherein the angle between the second optical axis and the first optical axis and the angle between the third optical axis and the first optical axis are about seventy five degrees.

16. The illumination module as claimed in claim 11, wherein the red emitting light emitting diode emits at a principal wavelength of about six hundred twenty seven nanometers, the green emitting light emitting diode emits at a principal wavelength of about five hundred thirty nanometers and the blue emitting light emitting diode emits at a principal wavelength of about four hundred fifty five nanometers.

17. The illumination module as claimed in claim 11, further comprising a dichroic filter in the beam path of the second light emitting diode, the dichroic filter being a long pass filter transmitting wavelengths from about six hundred nanometers to about six hundred seventy nanometers and reflecting wavelengths from about four hundred seventy nanometers to about five hundred eighty nanometers, the dichroic filter further comprising an antireflective coating allowing the complete passage of red light.

18. The illumination module as claimed in claim 11, further comprising a dichroic filter in the beam path of the third light emitting diode, the dichroic filter being a long pass filter transmitting wavelengths from about four hundred eighty nanometers to about six hundred seventy nanometers and reflecting wavelengths from about four hundred twenty nanometers to about four hundred seventy nanometers, the dichroic filter further comprising an antireflective coating allowing the complete passage of red light and green light.

19. The illumination module as claimed in claim 11, further comprising convergent lenses positioned between the first, second and third light emitting and their respective dichroic filters each lens being coated with a coating selected to pass a respective color of light.

20. The illumination module as claimed in claim 19, in which the convergent lenses are aspheric and formed of plastic.

21. The illumination module as claimed in claim 11, further comprising a convergent lens placed on the first optical axis and after the first, second and third beam paths are combined.

* * * * *